(12) United States Patent
Eisinger et al.

(10) Patent No.: US 11,745,951 B2
(45) Date of Patent: Sep. 5, 2023

(54) DRIVE DEVICE FOR A CONVEYOR CARRIAGE OF A CONVEYOR DEVICE

(71) Applicant: Interroll Holding AG, Sant' Antonino (CH)

(72) Inventors: Thomas Eisinger, Hückelhoven (DE); Jan-Niklas Laier, Hückelhoven (DE)

(73) Assignee: Interroll Holding AG, Sant' Antonino (CH)

( * ) Notice: Subject to any disclaimer, the term of this patent is extended or adjusted under 35 U.S.C. 154(b) by 2 days.

(21) Appl. No.: 17/764,596

(22) PCT Filed: Sep. 22, 2020

(86) PCT No.: PCT/EP2020/076441
§ 371 (c)(1),
(2) Date: Mar. 29, 2022

(87) PCT Pub. No.: WO2021/073843
PCT Pub. Date: Apr. 22, 2021

(65) Prior Publication Data
US 2022/0388781 A1 Dec. 8, 2022

(30) Foreign Application Priority Data

Oct. 17, 2019 (DE) .......................... 102019007225.1

(51) Int. Cl.
*B65G 23/14* (2006.01)
*B65G 17/06* (2006.01)
*B65G 47/96* (2006.01)

(52) U.S. Cl.
CPC ........... *B65G 23/14* (2013.01); *B65G 17/065* (2013.01); *B65G 47/96* (2013.01); *B65G 2201/02* (2013.01)

(58) Field of Classification Search
CPC ...... B65G 17/06; B65G 17/065; B65G 23/14; B65G 47/96; B65G 47/967; B65G 2201/02
USPC ....................................................... 198/370.03
See application file for complete search history.

(56) References Cited

U.S. PATENT DOCUMENTS

| 4,399,904 | A | * | 8/1983 | Canziani | ............. | B65G 47/962 104/163 |
| 6,244,188 | B1 | | 6/2001 | Buechi | | |
| 6,607,073 | B2 | * | 8/2003 | Buchi | .................... | B65G 35/08 198/805 |
| 6,907,985 | B1 | | 6/2005 | Axmann | | |
| 7,381,022 | B1 | * | 6/2008 | King | .................... | B65G 1/1375 414/807 |

(Continued)

FOREIGN PATENT DOCUMENTS

| CN | 105848799 A | 8/2016 |
| CN | 106005898 A | 10/2016 |

(Continued)

*Primary Examiner* — Douglas A Hess
(74) *Attorney, Agent, or Firm* — Michael Soderman (57) ABSTRACT

The invention relates to a drive device (1) for a conveyor carriage (4) of a conveyor device (2), comprising a drive source (6) for generating a drive force (FTr) and a drive force transmission device (8) for transmitting the drive force (FTr) to a drive surface of the conveyor carriage (4). The conveyor carriage (4) has at least one counter bearing element (12) in particular which is designed as a counter bearing for the drive force transmission device (8).

19 Claims, 3 Drawing Sheets

(56) References Cited

U.S. PATENT DOCUMENTS

| | | | | |
|---|---|---|---|---|
| 8,955,963 | B2* | 2/2015 | Olejniczak | B41F 21/00 198/377.04 |
| 9,315,172 | B1* | 4/2016 | Wentworth | B60S 3/004 |
| 10,034,453 | B2* | 7/2018 | Neighbors | A01K 5/0208 |
| 11,618,364 | B1* | 4/2023 | Mohammed | B62B 3/002 298/29 |
| 2007/0283839 | A1 | 12/2007 | Bartlett, Jr. et al. | |
| 2021/0221618 | A1* | 7/2021 | Austrheim | |
| 2022/0274790 | A1* | 9/2022 | Eisinger | |
| 2022/0371834 | A1* | 11/2022 | Graston et al. | |

FOREIGN PATENT DOCUMENTS

| | | |
|---|---|---|
| CN | 110088015 A | 8/2019 |
| CN | 110730752 A | 1/2020 |
| DE | 20107487 U1 | 9/2001 |
| DE | 112009005474 T5 | 6/2011 |
| DE | 102016112324 A1 | 1/2018 |
| DE | 102017006212 A1 | 1/2019 |
| EP | 1057755 A2 | 12/2000 |
| EP | 1199261 A1 | 4/2002 |
| FR | 1368646 A | 7/1964 |
| GB | 799455 A | 8/1958 |
| JP | 2007210780 A | 8/2007 |
| NL | 9800010 A | 2/1999 |

* cited by examiner

DRIVE DEVICE FOR A CONVEYOR CARRIAGE OF A CONVEYOR DEVICE

CROSS REFERENCE TO RELATED APPLICATIONS

This application is the U.S. national stage of International Application No. PCT/EP2020/076441, filed on 2020 Sep. 22. The international application claims the priority of DE 102019007225.1 filed on 2019 Oct. 17; all applications are incorporated by reference herein in their entirety.

BACKGROUND

The invention relates to a drive device for a conveyor carriage of a conveyor installation for conveying items to be conveyed, and to a drive force transmission installation for a drive device of this type.

As is disclosed in DE 10 2017 006 212 A1, in a conventional drive device for a conveyor carriage of a conveyor installation the conveyor carriage is usually pulled by means of a rubber block chain. Such conveyor carriages are equipped with a drivable conveyor belt which is disposed transversely to the conveying direction and are preferably used in revolving, in particular closed, chains of carriages as crossbelt sorters so as to receive and distribute piece goods for high-volume distribution in mail and distribution centers. The rubber block chain here is jammed in a gap between a drive belt and a counter pressure belt of a drive force transmission installation. The drive belt, which in turn is driven, in this manner drives the rubber block chain and thus the conveyor carriages.

Such known solutions are in most instances heavy, maintenance intensive and expensive in terms of production. These disadvantages can largely be traced back to the above-described driving mode and are a result of the complex drive force transmission installation having a drive belt and a counter pressure belt, for example. The multiplicity of different parts resulting from the driving mode, in particular the rubber block chain which is also required here and in terms of length is required so as to correspond to the entire conveying section, contribute in particular toward the high costs.

A further disadvantage of such known solutions is that a space below the respective conveyor carriage is at least partially traversed by the rubber block chain. This impedes or prevents the use of conveyor carriages which release their conveyed items downward by means of one or a plurality of flaps in the manner of a trapdoor. This type of conveyor installation is also referred to as a split tray sorter.

U.S. Pat. No. 6,244,188 B1 discloses an installation having a plurality of movable vehicles. In order for the vehicles to be driven, a drive belt is temporarily fastened to the vehicle. To this end, the drive belt by means of a deflection roller is squeezed into a notch on the vehicle, as a result of which a force-fitting connection between the vehicle and the drive belt is established at the notch. The drive belt, even after a long period of use, must at all times have a surface condition which facilitates the press-fit connection with the vehicle.

US 2007/0283839 A1 discloses a similar installation in which a multiplicity of pallets are driven by a drive unit along a travel section. Here, a timing belt is used to establish a driving connection between a drive wheel and the pallets. The timing belt is driven by way of a gear wheel. The drive unit is disposed so as to be substantially horizontal. The contact pressure force is provided by pneumatic actuators. The drive units are disposed in pairs on both sides of the pallets. As a result, the pallets are braced on the entire width thereof by the contact pressure force.

SUMMARY

It is an object of the invention to make available an improved drive for a conveyor carriage of a conveyor installation, in which the maintenance requirement and the costs are in particular minimized and/or the production is simplified.

The object is achieved by the subject matter of the independent patent claims. The respective dependent patent claims relate to preferred refinements of the subject matter of the present invention.

DETAILED DESCRIPTION

One aspect relates to a drive device for a conveyor carriage of a conveyor installation, having a drive source for generating a drive force, and a drive force transmission installation for transmitting the drive force to a drive surface of the conveyor carriage, wherein the conveyor carriage has at least one counter bearing element which is configured as a counter bearing for the drive force transmission installation.

One advantage of the present invention is simplified and more cost-effective production of the drive device and/or of the drive force transmission installation due to a reduced complexity in terms of components. The required installation space and/or the installation complexity can also be reduced here. In comparison to a customary drive device, a counter pressure installation on the drive force transmission installation can be dispensed with. This is enabled by means of utilizing one or a plurality of counter bearings which is/are disposed on the conveyor carriage, and may already be present on the conveyor carriage anyway, and which are suitable as a counter bearing for the drive force transmission installation and for absorbing the drive force. A drive surface which is configured on the conveyor carriage and is suitable for driving the conveyor carriage is utilized for driving the conveyor carriage here. As a cost-effective component, the drive surface can either be present on the conveyor carriage anyway, or be attached to the conveyor carriage exclusively for the purpose of transmitting the drive force to the drive surface. Furthermore, a rubber block chain can be dispensed with because, as described above, a drive surface which is configured on the conveyor carriage is utilized for driving the conveyor carriage, on the one hand, and the conveyor carriages are coupled to one another by means of simpler means, in particular coupling bars described hereunder and/ or double articulations, on the other hand.

A further advantage of the present invention is a universal potential use of the drive device and/or of the drive force transmission installation for different types of conveyor carriages, for example for a conveyor carriage of a crossbelt sorter or of a split tray sorter.

The drive device for the conveyor carriage of the conveyor installation can be a device for driving the conveyor carriage of the conveyor installation by means of which the conveyor carriage is able to be moved along the conveyor installation, for example for transporting a conveyed item on a conveyor carriage from a starting location to a destination.

For transporting the conveyed item, the conveyor carriage of the conveyor installation can have a conveying plane and/or conveying surface which is configured so as to be substantially perpendicular to a direction of gravity and on which the conveyed item is able to be placed by virtue of the gravity acting thereon, thus being able to be transported by means of the conveyor carriage. The conveyor carriage can have a transverse belt for conveying conveyed items in a direction transverse to the conveying direction of the conveyor installation. Alternatively thereto, the conveyor carriage can have flaps of a split tray sorter, for example.

For transporting conveyed items in a conveying direction the conveyor installation can have one or a plurality of conveyor carriages and one or a plurality of drive devices for the conveyor carriage/carriages. In particular, the conveyor installation can have a closed chain of interconnected conveyor carriages, thus be configured as a horizontal conveyor, for example.

An electric, hydraulic or electrohydraulic drive source can be used as the drive source of the drive device, for example. The drive source can be configured as a motor and provides the drive force. The drive source can be configured as a component part of the drive force transmission installation.

For transmitting the drive force of the drive source to the drive surface of the conveyor carriage, the drive force transmission installation can have an effective drive surface from which the drive force is able to be transmitted, or is transmitted, to the drive surface. The drive force transmission installation is connected to the drive source and transmits at least part of the drive force to the conveyor carriage.

The drive force transmission installation can be configured as a static component which is fastened to and/or disposed on a frame of the conveyor installation, for example.

The drive surface can be a surface for driving the conveyor carriage which is present on the conveyor carriage anyway and, while required for another reason, is also suitable for driving the conveyor carriage. Alternatively thereto, the drive surface can be attached to the conveyor carriage exclusively for transmitting the drive force to the drive surface. The drive surface is configured as a driven surface. The drive surface can be configured in such a manner that said drive surface moves conjointly with the conveyor carriage and relative to the drive force transmission installation.

When traveling past the drive force transmission installation, the drive surface can operatively contact the latter such that the drive force can at least partially be transmitted to said drive surface. The drive surface can extend across the entire length of the conveyor carriage so that said drive surface can operatively contact the drive force transmission installation for an ideally long time.

The counter bearing element can be an element which is disposed on the conveyor carriage and which potentially may also serve another purpose but is also suitable as a counter bearing for the drive force transmission installation. The counter bearing element here can absorb a contact pressure force of the drive force transmission installation and as a result facilitate and/or enable the transmission of the drive force. For example, the counter bearing element can be configured as a support roller and/or a guide roller on the conveyor carriage, the conveyor carriage being supported in relation to gravity and/or a horizontal or vertical force, in particular a centrifugal force, on said roller, in particular on an advantageously stationary component of the conveyor installation such as, for example, a guide. The counter bearing element can support the drive surface of the conveyor carriage in relation to the drive force transmission installation, in particular in relation to the effective drive surface of the latter. The counter bearing element can be configured for absorbing a contact pressure force of the drive force transmission installation on the drive surface so as to as a result facilitate and/or enable the transmission of the drive force from the drive force transmission installation to the drive surface of the conveyor carriage.

The drive surface and/or the conveyor carriage can advantageously be supported in relation to a contact pressure force of the drive force transmission installation by means of the counter bearing element.

The drive surface can in particular have a sufficient stability for absorbing a contact pressure force required for the transmission of force, for example a flexural stiffness and/or surface hardness sufficient for this purpose. The drive surface can be, for example, a face of the frame of the conveyor carriage that is in particular adapted to these requirements.

The contact pressure force required for the drive force transmission can thus be reliably exerted on the drive surface and/or be absorbed by the drive surface without the drive surface and/or the conveyor carriage yielding or being deformed because of the contact pressure force acting thereon.

When viewed in the conveying direction, the drive force transmission installation can advantageously be disposed exclusively on a lateral side of the conveyor carriage, i.e. on the left or the right. In other words, when viewed in the conveying direction, the conveyor carriage is able to be driven, or is driven, by the drive force transmission installation exclusively on one side of the conveyor carriage, i.e. on the left or the right.

The drive force transmission installation can preferably be disposed on the inside of a curve of the conveyor installation, wherein the conveyor installation can have only curves in the one direction. The drive force transmission installation here can be typically disposed on a straight portion of the conveyor installation.

The drive force can advantageously be able to be transmitted, or be transmitted, in a friction-fitting manner from the drive force transmission installation to the drive surface. A friction-fitting transmission of force requires a normal force acting on the surfaces connected in a friction-fitting manner. A relative movement of the surfaces is at least reduced or prevented in the case of a sufficient normal force and/or a sufficient coefficient of friction for the static friction of the surfaces connected in a friction-fitting manner.

The drive force transmission installation for transmitting the drive force of the drive source to the drive surface of the conveyor carriage can be a suitable installation having a friction face which is sufficient for transmitting the drive force in a friction-fitting manner. For example, the drive force transmission installation can contain at least one friction belt and/or at least one friction wheel.

The drive surface can advantageously be configured as a friction face and, conjointly with the effective drive surface, be conceived with a view to a coefficient of friction for an effective or optimized friction-fitting transmission of force.

Using the above configuration, the drive force can be reliably transmitted from the drive force transmission installation to the drive surface.

The at least one counter bearing element can advantageously be configured as a roller and/or as a sliding element of the conveyor carriage. A component by way of which the conveyor carriage when moving is supported counter to gravity and/or a horizontal and/order vertical force, in particular a centrifugal force, and which is anyway required for moving the conveyor carriage in the conveying direction, can thus be utilized as a counter bearing element. A reduction in the number of parts of the drive device can be implemented as a result.

For example, the at least one counter bearing element is configured as a support roller and/or as a guide roller of the conveyor carriage.

The support roller here is configured for supporting the weight of the conveyor carriage and can have an approximately horizontal rotation axis. The guide roller is aligned for guiding the conveyor carriage along a conveying path and can have an approximately vertical rotation axis or at least a rotation axis having a vertical component. Means which are anyway present on the conveyor carriage for supporting the latter on the conveyor installation can thus also be used as counter bearings for the drive force transmission installation and for transmitting the drive force. The above configuration contributes toward minimizing the maintenance complexity and the costs associated with the drive device according to the invention, and/or toward simplifying the production of the latter.

A contact pressure force, in particular a resultant thereof, of the drive force transmission installation on the drive surface can advantageously be at least partially aligned so as to be substantially perpendicular to the drive surface. It is understood that the drive surface here can be correspondingly configured in such a manner, in particular so as to be flat and parallel to the effective drive surface, that the effective drive surface of the drive force transmission installation bears on the drive surface over an ideally large area.

An ideally high degree of efficiency in transmitting the drive force to the drive surface can be achieved using the above configuration.

The effective drive surface of the drive force transmission installation can advantageously be aligned so as to be substantially horizontal, wherein the effective drive surface is pressed onto the drive surface by a contact pressure force aligned so as to be substantially vertical.

The above configuration can furthermore contribute toward achieving an ideally high degree of efficiency in transmitting the drive force to the drive surface. Support rollers can in particular be used as a counter bearing element here.

The contact pressure force can advantageously be caused at least by means of the weight of the drive force transmission installation. The contact pressure force here can in particular be caused exclusively by means of the weight of the drive force transmission installation, or the contact pressure force can additionally be increased using additional means. Because the weight of the drive force transmission installation is always present anyway, this configuration provides a particularly simple possibility for generating or at least facilitating the contact pressure force.

Alternatively to what has been described above, the effective drive surface of the drive force transmission installation can be aligned so as to be substantially vertical, wherein the effective drive surface is pressed onto the drive surface by a contact pressure force aligned so as to be substantially horizontal. At least one guide roller can be used as a counter bearing element here, for example.

Furthermore alternatively to what has been described above, the effective drive surface of the drive force transmission installation can be aligned in an angular position between the horizontal and the vertical, wherein the effective drive surface is pressed onto the drive surface by a contact pressure force aligned so as to be substantially perpendicular to the effective drive surface. At least one guide roller and/or at least one support roller can be used as a counter bearing element here, for example.

Advantageously, a contact pressure force of the drive force transmission installation can at least be partially caused by means of a contact pressure installation.

For example, the contact pressure installation can be configured as a spring contact pressure installation which is in particular disposed between the conveyor installation and the drive force transmission installation. Alternatively or additionally thereto, the contact pressure installation can be configured as one or a plurality of additional weights for the drive force transmission installation.

Depending on the design of the drive force transmission installation, the contact pressure force using the above configuration can be caused exclusively by means of the weight of the drive force transmission installation, and an additional contact pressure installation can be dispensed with or, depending on the specific application, the contact pressure force can be increased using a contact pressure installation which is additionally present.

For example, in the case of an effective drive surface which is aligned so as to be substantially horizontal, the contact pressure force can be caused exclusively by means of the weight of the drive force transmission installation. However, if an increase in the contact pressure force should be required in the process, the contact pressure force can additionally also be caused by means of the contact pressure installation.

Alternatively thereto, in the case of an effective drive surface which is aligned for example so as to be substantially vertical, the contact pressure force can be caused exclusively by means of the contact pressure installation.

Furthermore alternatively thereto, in the case of an effective drive surface which is aligned in an angular position between the horizontal and the vertical, the contact pressure force can at least be partially caused by means of the weight of the drive force transmission installation and, optionally, additionally by means of the contact pressure installation. The alignment of the effective drive surface can thus be chosen relatively freely depending on different requirements and/or conditions. As has already been mentioned above, it is understood here that the drive surface here is correspondingly configured in such a manner, in particular so as to be flat and parallel to the effective drive surface, that the effective drive surface of the drive force transmission installation bears on the drive surface over an ideally large area.

The drive force transmission installation can advantageously have a drive belt that is able to be pressed, or is pressed, onto the drive surface by means of the contact pressure force. As has already been mentioned above, a counter pressure installation in the drive force transmission installation, such as a counter pressure belt, for example, can be dispensed with here.

The above configuration contributes toward minimizing the maintenance complexity and the costs associated with the drive device according to the invention, and/or toward simplifying the production of the latter.

For example, the effective drive surface of the drive force transmission installation can be a surface of the drive belt or of a drive roller, in particular on the respective lower side thereof, which is in contact with the drive surface.

For example, the drive belt can be configured as a multi-rib belt.

The drive surface can in particular be configured as a friction face and, conjointly with the effective drive surface, be conceived with a view to a coefficient of friction for an effective or optimized friction-fitting transmission of force.

Using the above configuration, a drive device for conveyor carriages can be provided which, despite a gap between the conveyor carriages that are connected to one another so as to form the closed conveyor carriage chain, acts like a continuous drive of the conveyor carriages. A longitudinal extent of the effective drive surface of the drive belt here is larger than the gap between the conveyor carriages.

The effective drive surface of the drive belt in terms of the longitudinal extent thereof is dimensioned so as to be approximately between respective bearing points of the drive belt on the drive surface on the deflection rollers or on the outer contact pressure rollers of the drive belt, and in terms of the extent in the width is dimensioned so as to correspond approximately to the width of the drive belt.

The conveyor installation can advantageously have a plurality of drive force transmission installations which are disposed at predetermined mutual spacings.

This increases the total drive force provided to the conveyor system, for example in the case of conveyor installations having long trains of conveyor carriages, in the case of inclines to be overcome and/or in the case of heavy loads being conveyed.

The counter bearing element, when viewed perpendicularly to the conveying direction, can advantageously be configured at a minimum spacing from an effective line of a contact pressure force of the drive force transmission installation, said spacing being less than approximately 70 mm and/or approximately 50 mm. Depending on whether the effective drive surface is configured so as to be horizontal or vertical, the minimum spacing can be configured so as to be horizontally perpendicular or vertically perpendicular to the conveying direction. For example, the minimum spacing can be configured between the center of the support roller or the center of the guide roller, on the one hand, and the center of the drive belt, on the other hand.

The counter bearing can be in particular configured so as to have a minimum spacing from the effective line of the contact pressure force. The minimum spacing can be greater than approximately 0 mm and smaller than approximately 10 mm, for example.

When viewed in the conveying direction, at least two counter bearing elements can in each case be disposed in particular laterally on the conveyor carriage, i.e. on the left and the right, wherein, when viewed in the conveying direction, at least one counter bearing element can in each case be disposed on each side at the front and the rear on the conveyor carriage. Furthermore, the counter bearing elements on the side of the drive device can be disposed at the minimum spacing transverse to the conveying direction in such a manner that the effective line of the contact pressure force lies within or on an imaginary rectangle defined by connecting lines of the successively connected counter bearing elements. The minimum spacing here is the smallest spacing which arises when passing the drive force transmission installation.

For example, the minimum spacing of the counter bearing element can be less than approximately 60 mm, preferably less than approximately 40 mm.

The counter bearing element can advantageously be configured on a side of the conveyor carriage that lies opposite the drive surface.

Using the above configuration, a substantially stable position of the conveyor carriage driven by means of the drive device according to the invention can be achieved and, depending on the specific configuration, disturbing movements of the conveyor carriage such as, for example, rolling (movement about a longitudinal axis), pitching (movement about a transverse axis) and/or yawing (movement about a vertical axis) can be minimized or avoided.

A further aspect of the invention relates to a drive force transmission installation for a drive device according to the preceding aspect, wherein the drive force transmission installation is able to be introduced into a mounting configured on the conveyor installation and able to be locked therein.

One advantage of the present invention is that the drive force transmission installation according to the invention is able to be retrofitted, at least for conveyor installations having conveyor carriages which are suitable therefor and have a correspondingly configured drive surface and a correspondingly configured counter bearing element.

The drive force transmission installation can be configured in the manner of a suitcase module which for handling is configured with one or a plurality of handles.

The mounting can preferably have only one, in particular translatory, degree of freedom for the movement of the drive force transmission installation in the direction of the contact pressure force.

The mounting can be configured as U-profiles or H-profiles which are mutually spaced apart in the conveying direction and open toward one another. The respective profiles can be assembled on the conveyor installation by means of an angle bracket, for example.

The drive force transmission device is able to be coupled to the drive source such that the drive force transmission device absorbs the drive force.

Furthermore, the drive force transmission device is configured to operatively contact the drive surface of a conveyor carriage such that the drive force transmission device transmits the drive force to the drive surface and thus to the conveyor carriage, wherein a counter bearing element of the conveyor carriage is configured as a counter bearing for the drive force transmission installation.

A further aspect relates to the use of the drive force transmission device for driving at least one conveyor carriage of a conveyor installation as described above.

Exemplary embodiments of the drive device according to the invention are explained in more detail hereunder by means of drawings. It is understood that the present invention is not limited to the exemplary embodiments described hereunder, and that individual features thereof can be combined so as to form further exemplary embodiments.

DETAILED DESCRIPTION OF THE PREFERRED EMBODIMENTS

Figure 1:
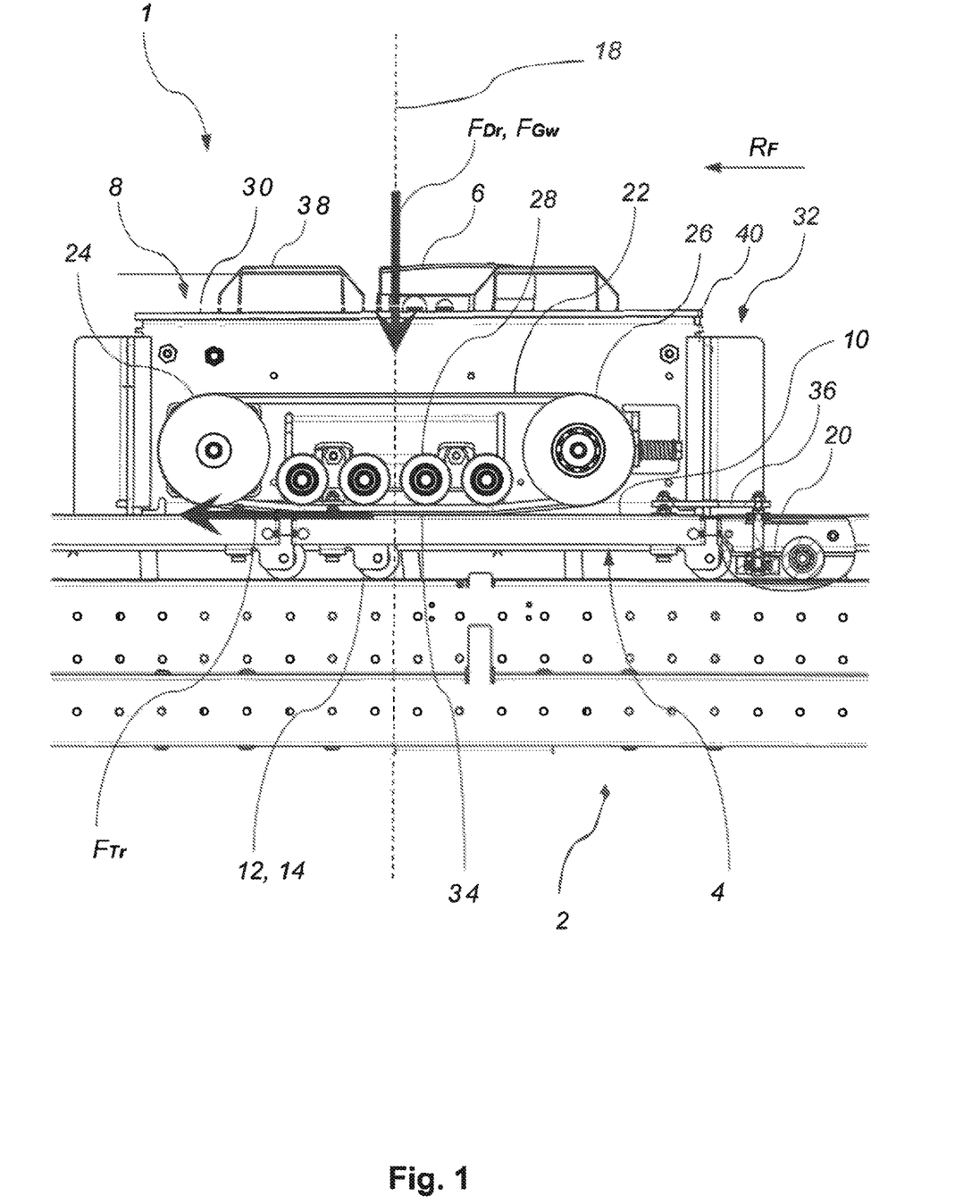
FIG. 1 shows a fragment of a conveyor installation, having a drive device according to the invention and according to one exemplary embodiment of the invention, in a lateral view.

A drive device 1 according to an exemplary embodiment of the invention, shown in FIG. 1, is disposed in a conveyor installation 2 so as to drive conveyor carriages 4 used therein, as is shown in a lateral view of a fragment of the conveyor installation 2. The conveyor installation 2 in the figures is configured as a split tray sorter in which each conveyor carriage 4 has two carrying trays which for discharging the transported items can be opened downward.

Figure 2:
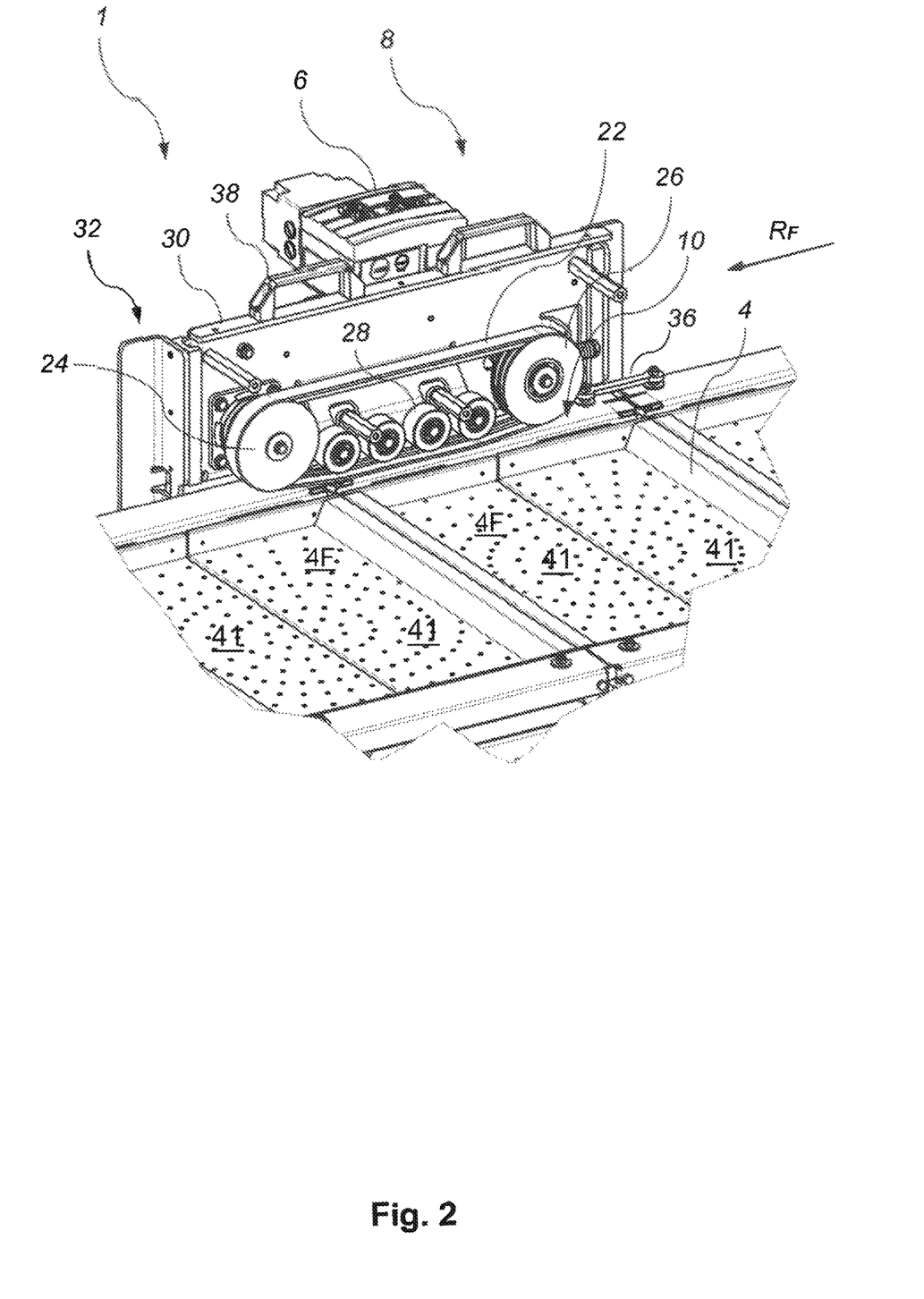
FIG. 2 shows an isometric view of the drive device according to FIG. 1.

As is shown in the perspective view of FIG. 2, for example, the drive device 1 when viewed in the conveying direction RF can be disposed only on one lateral side of the conveyor installation 2 and/or of the conveyor carriage 4.

The drive device 1 has a drive source 6 for generating a drive force FTr, and a drive force transmission installation 8 for transmitting the drive force FTr to a drive surface 10 of the conveyor carriage 4. The drive force FTr is configured for driving the conveyor carriage 4 approximately in the conveying direction RF and for this reason is aligned approximately in the conveying direction RF. The drive force FTr is shown as the force driving the conveyor carriage 4.

As is shown here, the drive source 6 can be disposed on the drive force transmission installation 8 and/or be disposed as a component part of the latter, and be configured as an electric motor, for example. During operation, the drive force transmission installation 8 by a contact pressure force FDr presses onto the drive surface 10 of the conveyor carriage 4 so as to transmit the drive force FTr to the drive surface 10. The drive surface 10 of the conveyor carriage 4 here can be configured as a face, for example as a rail, which is disposed so as to be approximately horizontal and extends approximately across the entire length of the conveyor carriage 4 in the conveying direction RF. The drive surface 10 is disposed on a lateral peripheral region of the conveyor carriage 4, next to the carrying trays of the conveyor carriage 4.

The conveyor carriage 4 has at least one counter bearing element 12 which is configured as a counter bearing for the drive force transmission installation 8 and for facilitating the transmission of the drive force FTr. As is illustrated in the exemplary embodiment shown in FIG. 1, at least one support roller 14 on which the conveyor carriage 4 on the conveyor installation 2 is supported in relation to gravity can be configured on the conveyor carriage 4. The conveyor carriage 4 preferably has a plurality of support rollers 14, for example four support rollers 14. The support rollers 14 serve for supporting the weight of the conveyor carriage 4 and can have an approximately horizontal rotation axis which is aligned so as to be approximately lateral to the conveying direction RF.

As is shown in FIG. 2, the conveyor carriage 4, when viewed in the plan view, can have a substantially rectangular shape. One support roller 14 can be disposed in each of the corner regions of the rectangular conveyor carriage 4 so that a total of four support rollers 14 can be present on the conveyor carriage 4. Alternatively thereto, more than four support rollers 14 may be present on the conveyor carriage 4. The support rollers 14 which, when viewed in the conveying direction RF, are present in each case laterally, i.e. on the left and the right, on the conveyor carriage can be aligned in the conveying direction RF. The conveyor carriage 4 has a conveying surface 4F on which piece goods can be deposited. The conveyor carriage 4 is adapted to release conveyed items downward by means of one or a plurality of flaps 41 in the manner of a trapdoor.

The support rollers 14 present can assume the function of the counter bearing element 12. The support rollers 14 here, in particular transversely to the conveying direction RF, thus in an approximately horizontal lateral direction, can be disposed at a minimum spacing from an effective line 18 of the contact pressure force FDr, preferably so as to be directly on that side of the drive surface 10 that lies opposite the drive force transmission installation 8. An essentially stable position of the conveyor carriage 4 driven by means of the drive device 1 described can be achieved as a result, and disturbing movements of the conveyor carriage 4 such as, for example, rolling (movement about a longitudinal axis) and/or pitching (movement about a transverse axis) can be minimized or avoided. To this end, the drive force transmission installation 8 and the counter bearing elements 12 on the side of the drive force transmission installation 8 can be disposed relative to one another at a minimum spacing from the effective line 18 of the contact pressure force FDr, when viewed transversely to the conveying direction RF. The counter bearing elements 12 can in particular be disposed in such a manner that a component of the contact pressure force FDr that would cause pitching is less that a counterforce applied by the counter bearing elements 12.

It is also conceivable that the drive force transmission installation 8 and the support rollers 14 of the conveyor carriage 4 to this end are disposed in such a manner that the effective line 18 of the contact pressure force FDr, when viewed in the direction of the force, lies within or on an imaginary rectangle defined by connecting lines of the successively connected counter bearing elements 12, i.e. of all support rollers 14 on the conveyor carriage 4.

In FIG. 1, the contact pressure force FDr is shown as a resultant in the center of the drive force transmission installation 8, when viewed in the conveying direction RF. In fact, the contact pressure force FDr does not act in a punctiform manner but as a linear load, and acts on the drive surface 10 in a rather planar manner, in particular so as to mitigate or avoid that the drive force transmission installation 8 plunges into intermediate spaces between the interconnected conveyor carriages 4.

The minimum spacing between the support roller 14 and the effective line 18 of the contact pressure force FDr transverse to the conveying direction RF can arise when the support roller 14 (when viewed in the lateral direction to the conveying direction RF) is disposed below the effective line 18 of the contact pressure force FDr.

At least one guide roller 20 can furthermore be provided on the conveyor carriage 4 (cf. FIG. 2), the conveyor carriage 4 on the conveyor installation 2 being supported in relation to a horizontal force, for example a centrifugal force when negotiating a curve, on said at least one guide roller 20. The guide roller 20 can have an approximately vertical rotation axis.

Figure 3:
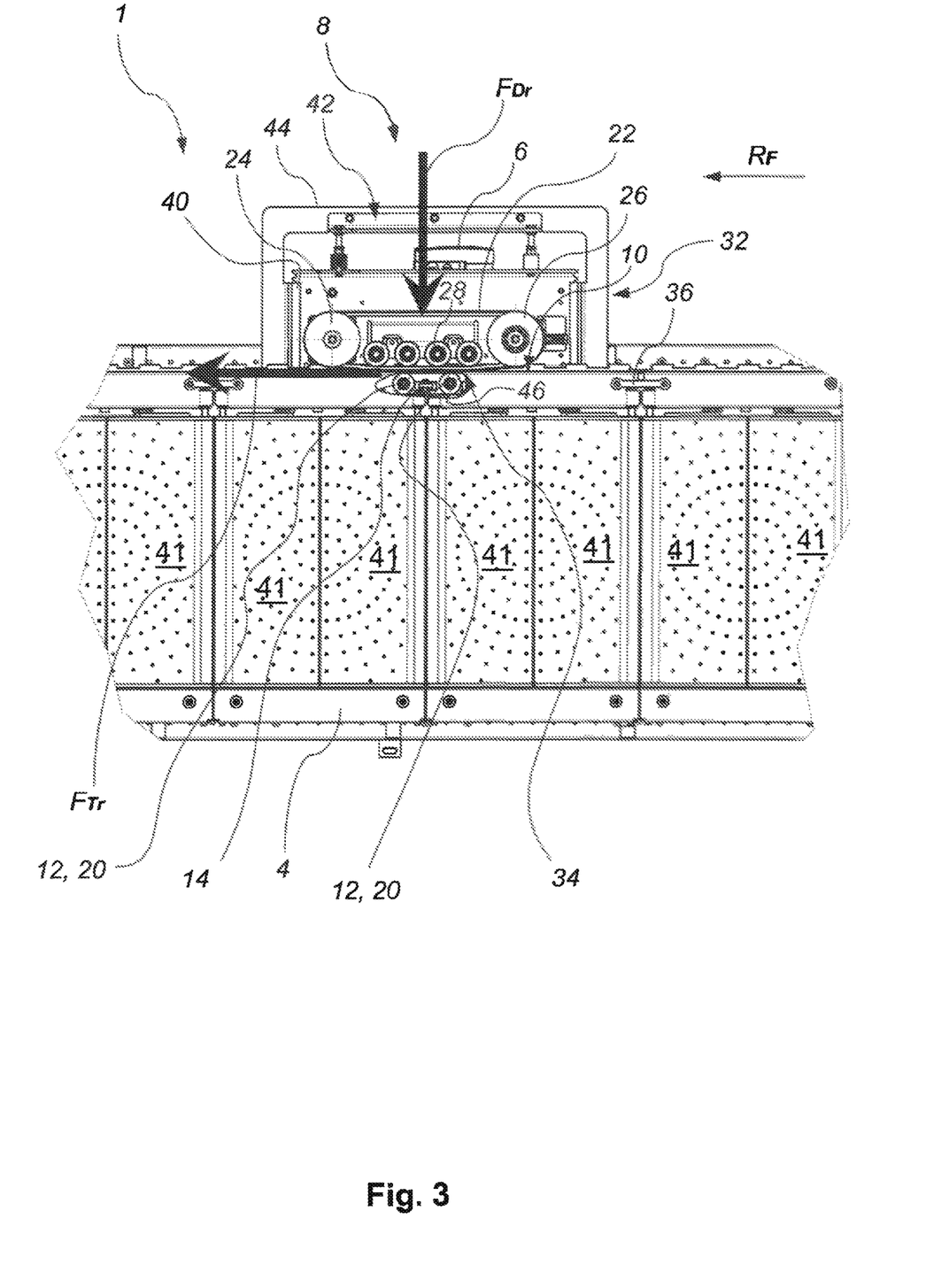
FIG. 3 shows a plan view of a drive device according to the invention and according to a further exemplary embodiment of the invention.

When viewed in the conveying direction RF, one guide roller 20 can in each case be provided at the front and the rear on the conveyor carriage 4 on that side of the conveyor carriage 4 on which the drive force transmission installation 8 is disposed (typically on the inside of a curve), so that a total of two guide rollers 20 can be provided on the conveyor carriage 4. The two guide rollers 20 of successive conveyor carriages 4 in FIG. 3 are shown for another exemplary embodiment. Alternatively thereto, more than two guide rollers 20 may be present on the conveyor carriage 4.

As is furthermore shown in FIG. 1, the drive force transmission installation 8 can have a drive belt 22. The drive belt 22 can be wrapped about two deflection rollers 24, 26. Moreover, a first deflection roller 24 represents a drive roller 24 driven by the drive source 6. A second deflection roller 26 can also be configured as a tension roller. One or a plurality of contact pressure rollers 28 of the drive force transmission installation 8 can be configured as a belt contact pressure assembly between the deflection rollers 24, 26 so as to be able to reliably press the drive belt 22 onto the drive surface 10. As is illustrated in the exemplary embodiment shown in FIG. 1, four contact pressure rollers 28 can be configured, but a different number of contact pressure rollers 28 may be configured depending on the axial spacing between the drive roller 24 and the deflection roller 26.

In the exemplary embodiment shown in FIG. 1 it is demonstrated that the drive roller 24, the deflection roller 26 and the contact pressure rollers 28 can be disposed on a base plate 30 of the drive force transmission installation 8, wherein the base plate 30 of the drive force transmission installation 8 by way of free end portions that lie opposite one another in the conveying direction RF can be received in a mounting 32 attached to the conveyor installation 2.

The drive force transmission installation 8, as is illustrated, can be received in the mounting 32 in such a manner that an effective drive surface 34 of the drive belt 22 can be aligned so as to be substantially horizontal, wherein the effective drive surface 34 can be pressed onto the drive surface 10 by a contact pressure force FDr aligned so as to be substantially vertical.

The effective drive surface 34 is provided by that side of the drive belt 22 that faces the drive surface 10. Said effective drive surface 34 in the exemplary embodiment shown in FIG. 1 in terms of the longitudinal extent thereof is dimensioned so as to be approximately between respective bearing points of the drive belt 22 on the drive surface 10 on the outer contact pressure rollers of the drive belt, and in terms of the extent in the width thereof is dimensioned so as to correspond approximately to the width of the drive belt. When the contact pressure rollers 28 by way of the bearing points thereof are at the same height level as the drive roller 24 and the deflection roller 26 by way of the bearing points thereof, the longitudinal extent of the effective drive surface 34 can alternatively be dimensioned so as to be approximately between respective bearing points of the drive belt 22 on the drive surface 10 on the drive roller 24 and on the deflection roller 26.

The contact pressure force FDr in the exemplary embodiment shown can correspond to the weight FGw of the drive force transmission installation 8, the latter being disposed above the drive surface 10 and bearing thereon. Moreover, the drive unit by virtue of the substantially vertical alignment can be attached in a favorably space-saving manner because a vertical installation space in storage and production facilities is in most instances more favorably available than a horizontal installation space.

For example, in the case of a weight FGw of the drive force transmission installation 8 of approximately 400 N and a coefficient of friction μ of approximately 1.5 between the drive belt 22 and the drive surface 10 in the exemplary embodiment shown in FIG. 1, in which the contact pressure force FDr is equal to the weight of the drive force transmission installation 8, the drive force FTr can be calculated according to the formula drive force $FTr$=coefficient of friction μ*contact pressure force $FDr$ and is approximately 600 N.

An isometric view of the drive device 1 according to FIG. 1 is shown in FIG. 2, wherein the conveyor carriages 4 driven by the latter are for a split tray sorter, said conveyor carriages 4 on the side of the drive force transmission installation 8 being coupled to one another by means of a coupling bar 36 so as to be pivotable in the conveying plane. As is illustrated in the exemplary embodiment, the drive force transmission installation 8 and the coupling bars 36 can preferably be disposed on the same side, specifically the inside of a curve of the conveyor installation 2.

As is furthermore shown in FIG. 2, the drive force transmission installation 8 can be configured in the manner of a suitcase module, wherein for handling two handles 38, on which the drive force transmission installation 8 is held, thus being able to be introduced into the mounting 32, can be configured on the base plate 30.

The mounting 32 can be configured as profiles 40, in particular U-profiles, which are spaced apart in the conveying direction RF and open toward one another.

In the exemplary embodiment illustrated in FIGS. 1 and 2, the contact pressure force FDr is applied exclusively by the weight of the drive force transmission installation 8 having the drive source 6. Because the effective drive surface 34 is aligned so as to be substantially horizontal, as has been described above, the contact pressure force FDr acts substantially perpendicularly from the effective drive surface 34 to the drive surface 10.

A drive device according to the invention is illustrated in a plan view in the further exemplary embodiment of the invention shown in FIG. 3.

The points of differentiation in comparison to the exemplary embodiment shown above in FIGS. 1 and 2 will be described hereunder.

The drive force transmission installation 8 in relation to the embodiment shown in FIGS. 1 and 2 is disposed so as to be tilted by approximately 90°. The drive force transmission installation 8 can be received in the mounting 32 in such a manner that the effective drive surface 34 of the drive belt 22 can be aligned so as to be substantially vertical, whereby the effective drive surface 34 can be pressed onto the drive surface 10 by a contact pressure force FDr aligned so as to be substantially horizontal and approximately lateral, thus approximately perpendicular to the conveying direction FR. The drive surface 10 of the conveyor carriage 4 here can be configured as an approximately vertically disposed face, for example as a rail, which extends across approximately the entire length of the conveyor carriage 4 in the conveying direction FR.

For this reason, the contact pressure force FDr in this exemplary embodiment cannot be caused by the weight of the drive force transmission installation 8.

As is illustrated in the exemplary embodiment, the contact pressure force FDr can be caused by means of a contact pressure installation 42. For example, the contact pressure installation 42 can be configured as a spring contact pressure installation which is disposed between the conveyor installation 2 and the drive force transmission installation 8.

The profiles 40 of the mounting 32 here can be connected by a bracket 44 on which the contact pressure installation 42 is supported, thus being able to cause the contact pressure force FDr on the drive force transmission installation 8.

In this embodiment, the function of the counter bearing element 12 is assumed by the guide rollers 20 of the conveyor carriage 4. The guide rollers 20 here can be disposed exclusively on the side of the drive force transmission installation 8. To this end, the guide rollers 20, when viewed in the conveying direction RF, can be disposed at the front and the rear on the conveyor carriage 4.

For example, the guide rollers 20 can be disposed in a guide profile 46 in which the guide rollers 20 are guided toward both lateral sides, thus supporting the conveyor carriage 4 in relation to a horizontal force, for example a centrifugal force when negotiating a curve. The guide profile 46 can be configured as a U-profile which is open toward the top or the bottom, for example.

The guide rollers 20, in particular transversely to the conveying direction RF, here can be disposed at a minimum spacing from an effective line 18 of the contact pressure force FDr in such a manner that a substantially stable position of the conveyor carriage 4 driven by means of the described drive device 1 is achieved, and disturbing movements of the conveyor carriage 4 are minimized or avoided.

In general, the guide rollers 20 can be configured for reducing yawing (movement about a vertical axis). To this end, the counter bearing elements 12 can be disposed in such a manner that the effective line 18 of the contact pressure force FDr, when viewed transversely to the conveying direction RF, is spaced apart from a horizontal line of symmetry of the counter bearing elements 12 by the minimal spacing.

LIST OF REFERENCE NUMERALS

1 Drive device
2 Conveyor installation
4 Conveyor carriage
4F Conveying surface
6 Drive source
8 Drive force transmission installation
10 Drive surface
12 Counter bearing element
14 Support roller
18 Effective line of the contact pressure force
20 Guide roller
22 Drive belt
24 Drive roller
26 Deflection roller
28 Contact pressure roller
30 Base plate
32 Mounting
34 Effective drive surface
36 Coupling bar
38 Handle
40 Profile
41 Plurality of flaps in the manner of a trapdoor
42 Contact pressure installation
44 Bracket
46 Guide profile
FDr Contact pressure force
FTr Drive force
FGw Weight
RF Conveying direction

The invention claimed is:

1. A conveyor installation (2), comprising
at least one conveyor carriage (4) having a drive surface (10),
a drive device (1) adapted for at least temporarily driving the at least one conveyor carriage (4),
the drive device (1) comprising
a drive source (6) for generating a drive force (FTr), and
a drive force transmission installation (8) for transmitting the drive force (FTr) to the drive surface (10) of the conveyor carriage (4),
wherein the conveyor carriage (4) has a receptacle region (4F), in particular a conveying surface (4F), for receiving piece goods,
characterized in
that the at least one conveyor carriage (4) is adapted to release conveyed items downward by means of one or a plurality of flaps in the manner of a trapdoor, that the drive surface (10) in a plan view and when viewed in the driving direction, is disposed laterally next to the receptacle region (4F) and aligned so as to be horizontal.

2. The conveyor installation (2) as claimed in claim 1, wherein the drive surface (10) and/or the conveyor carriage (4) by means of a counter bearing element (12) are/is supported in relation to a contact pressure force (FDr) of the drive force transmission installation (8).

3. The conveyor installation (2) as claimed in claim 1, wherein the drive force transmission installation (8), when viewed in the conveying direction (RF), is disposed exclusively on a lateral side of the conveyor carriage (4).

4. The conveyor installation (2) as claimed in claim 1, wherein the drive force (FTr) is able to be transmitted, or is transmitted, in a friction-fitting manner from the drive force transmission installation (8) to the drive surface (10).

5. The conveyor installation as claimed in claim 1, wherein at least one counter bearing element (12) is configured as a roller and/or as a sliding element of the conveyor carriage (4).

6. The conveyor installation (2) as claimed in claim 1, wherein at least one counter bearing element (12) is configured as a support roller (14) and/or as a guide roller (20) of the conveyor carriage (4).

7. The conveyor installation (2) as claimed in claim 1, wherein a contact pressure force (FDr) of the drive force transmission installation (8) on the drive surface (10) is aligned so as to be substantially perpendicular to the drive surface (10).

8. The conveyor installation (2) as claimed in claim 1, wherein the drive force transmission installation (8) has an effective drive surface (34) which is aligned so as to be substantially horizontal and is pressed onto the drive surface (10) by a contact pressure force (FDr) aligned so as to be substantially vertical.

9. The conveyor installation (2) as claimed in claim 8, wherein the contact pressure force (FDr) is caused at least by means of the weight (FGw) of the drive force transmission installation (8).

10. The conveyor installation (2) as claimed in claim 1, wherein the drive force transmission installation (8) has an effective drive surface (34) which is aligned so as to be substantially vertical and is pressed onto the drive surface (10) by a contact pressure force (FDr) aligned so as to be substantially horizontal.

11. The conveyor installation 2) as claimed in claim 1, wherein the drive force transmission installation (8) has an effective drive surface (34) which is aligned in an angular position between the horizontal and the vertical and is pressed onto the drive surface (10) by a contact pressure force (FDr) aligned so as to be substantially perpendicular to the effective drive surface (34).

12. The conveyor installation (2) as claimed in claim 1, wherein a contact pressure force (FDr) of the drive force transmission installation (8) is at least partially caused by means of a contact pressure installation (42).

13. The conveyor installation (2) as claimed in claim 1, wherein the drive force transmission installation (8) has a drive belt (22) which is able to be pressed, or is pressed, onto the drive surface (10) by means of the contact pressure force (FDr).

14. The conveyor installation (2) as claimed in claim 1, wherein the drive belt (22) is wrapped about two deflection rollers (24, 26), wherein a contact pressure assembly (28) which is adapted for pressing the drive belt (22) onto the drive surface (10) by the contact pressure force (FDr) is provided between the two deflection rollers (24, 26),
  in particular wherein the contact pressure assembly (28) comprises one or a plurality of contact pressure rollers (28), and/or
  in particular wherein the deflection rollers (24, 26) do not serve for transmitting the contact pressure force (FDr) to the belt.

15. The conveyor installation (2) as claimed in claim 1, wherein the conveyor installation (2) has a plurality of drive force transmission installations (8) which are disposed at predetermined mutual spacings.

16. The conveyor installation (2) as claimed in claim 1, wherein a counter bearing element (12) is configured at a minimum spacing from an effective line of a contact pressure force (FDr) of the drive force transmission installation (8), said spacing being less than approximately 50 mm.

17. The conveyor installation (2) as claimed in claim 1, comprising a drive force transmission installation (8) for the drive device (1), wherein the drive force transmission installation (8) is able to be introduced into a mounting (32) configured on the conveyor installation (2) and able to be locked therein.

18. The conveyor installation (2) according to claim 1,
  wherein the drive device (1) is disposed so as to be stationary during operation.

19. The conveyor installation (2) as claimed in claim 18,
  wherein the receptacle region (4F) is a conveying surface (4F).

\* \* \* \* \*